Sept. 11, 1928.

A. SJOSTROM 1,683,926

CHICKEN BROODER

Filed Jan. 31, 1928

Agnes Sjostrom
Inventor

By C. A. Snow & Co.
Attorneys.

Sept. 11, 1928.　　　　A. SJOSTROM　　　　1,683,926
CHICKEN BROODER
Filed Jan. 31, 1928　　　　2 Sheets-Sheet 2
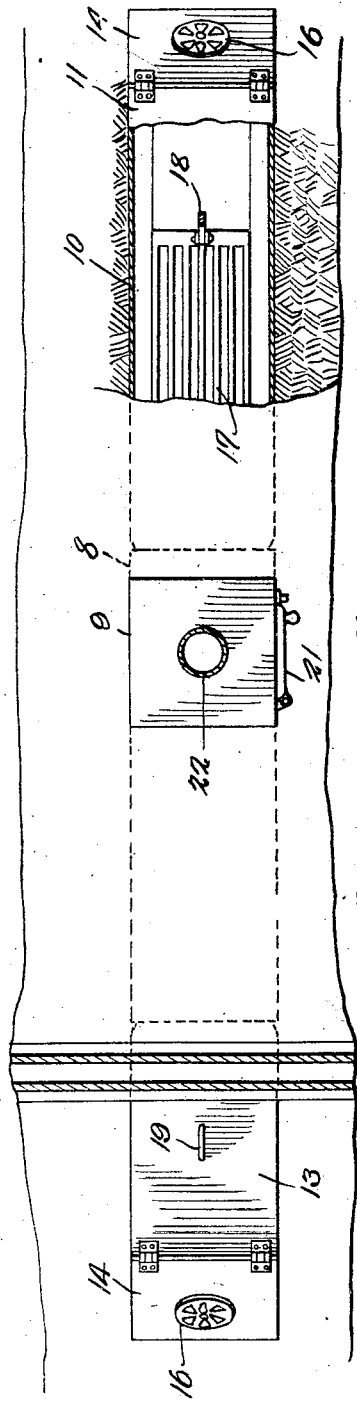
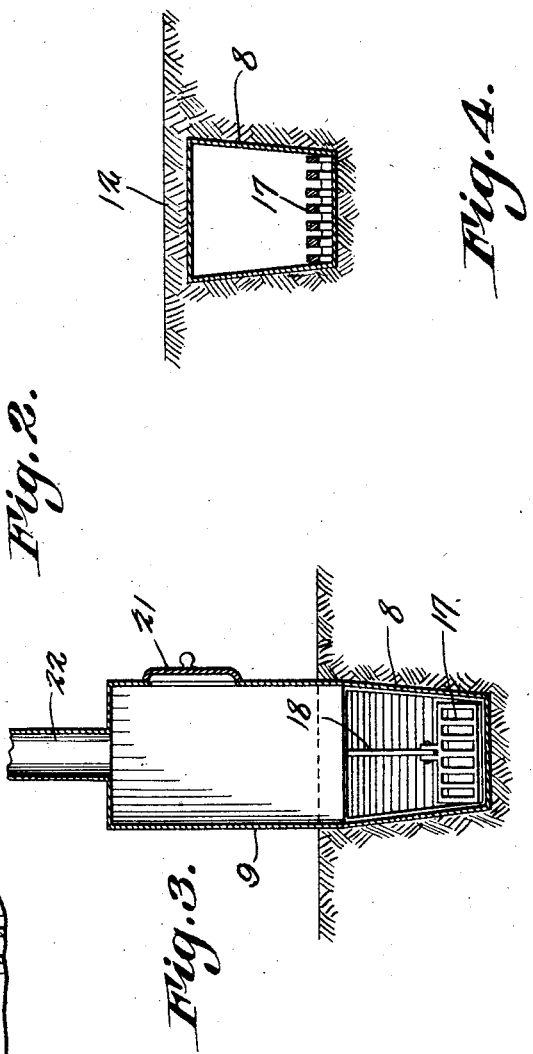
Agnes Sjostrom
Inventor
By C.A.Snow&Co.
Attorneys.

Patented Sept. 11, 1928.

1,683,926

UNITED STATES PATENT OFFICE.

AGNES SJOSTROM, OF CHEROKEE, IOWA.

CHICKEN BROODER.

Application filed January 31, 1928. Serial No. 250,801.

The present invention has reference to brooders, and more particularly to the heating system thereof, the primary object of the invention being to provide means whereby the chicks housed in the brooder will not be subjected to the direct heat of the heating plant.

An important object of the invention is to provide a heater of this character so positioned that the floor of the brooder will be thoroughly heated and the entire area of the brooder will be uniformly heated to insure against the chicks crowding which usually results in the injuring of the weaker chicks.

A still further object of the invention is to provide a brooder wherein the heating plant may be controlled from a point exteriorly of the brooder to the end that the interior of the brooder will not be chilled as the heating plant is being attended to.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 2 is a transverse sectional view through a portion of the brooder, one end of the heater being shown in section.

Figure 3 is a vertical sectional view through the central portion of the heater.

Figure 4 is a sectional view taken on line 4—4 of Figure 1.

Figure 1:
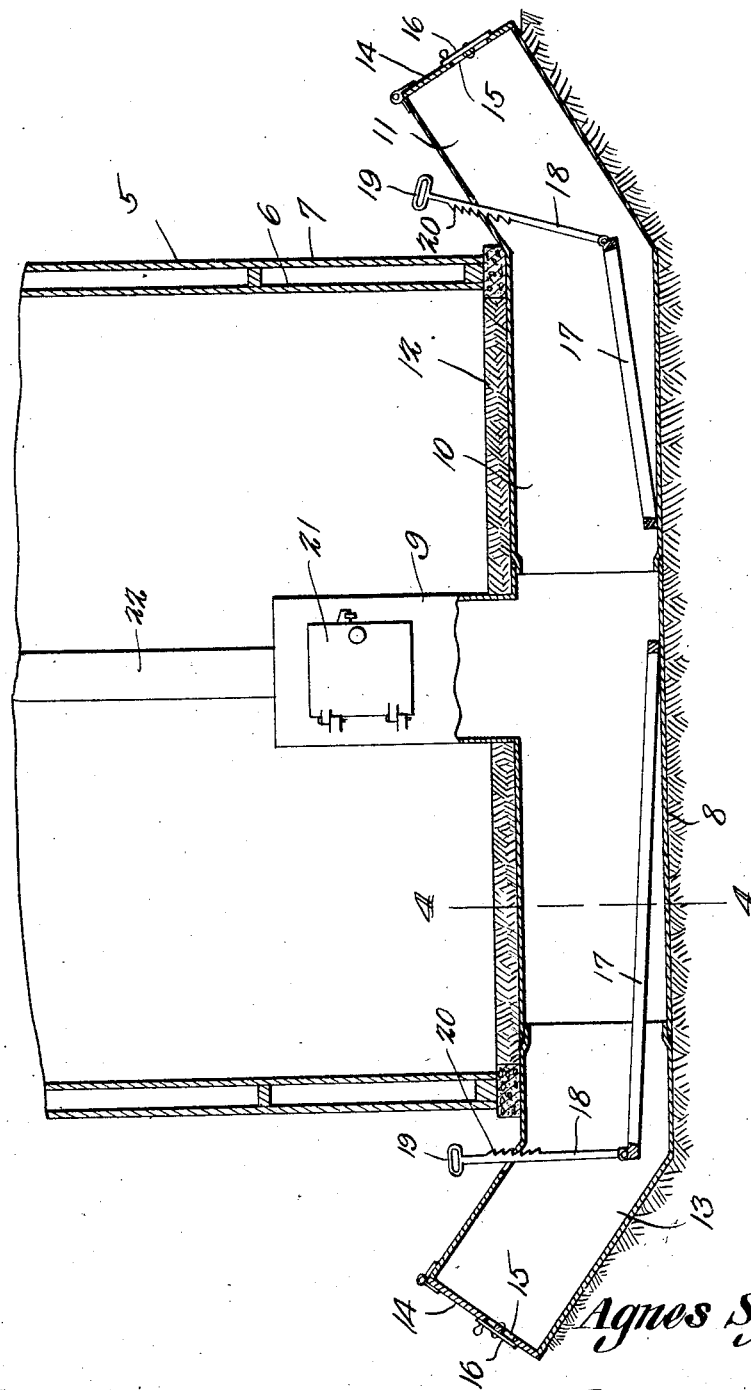
Figure 1 is a vertical sectional view through a brooder constructed in accordance with the invention.

Referring to the drawings in detail, the brooder proper is indicated generally by the numeral 5 and includes spaced walls 6 and 7 respectively, defining a dead air space to insulate the interior of the brooder against cold.

The general shape of the brooder proper forms no part of the invention and it is within the scope of this invention to provide circular, rectangular or other shape brooders with a heating plant forming the essence of the invention.

As clearly shown by Figure 1, the heater includes a substantially rectangular section 8 having an upstanding portion 9 disposed intermediate the ends of the heater proper, the portion 9 being disposed at a point within the brooder to thoroughly heat the interior of the brooder.

Communicating with one end of the section 8 is a section 10 formed with an upwardly inclined end portion 11 that extends to a point above the ground surface on which the brooder is resting, it being understood that the heater in this invention is buried in the ground surface, and the floor of the brooder, which is indicated at 12, and which may be dirt or other suitable material, rests directly on the heater to be heated by the heater.

An inclined section 13 connects with the opposite end of the section 8 and also extends to a point above the ground surface and beyond the side wall of the brooder so that an attendant may have easy access thereto, to the end that the fuel may be added to the heater with facility.

Closures 14 close the outer ends of the inclined portions 11 and 13 of the heater and are provided with draft openings 15, there being provided closures 16 for controlling the draft through the openings 15.

Within the heater are mounted pivoted grate bars 17 which are normally inclined as shown by Figure 1 of the drawings so that air may pass under the grate bars to insure the burning of the fuel supported thereon.

At the outer ends of the grate bars are vertical regulating bars 18 that have hand grips 19 at their upper ends, the bars 18 being shown as passing through openings in the inclined portions of the heater. Formed on the bars are teeth 20 that engage one edge of the openings to which they extend, so that the grate bars may be regulated vertically to accomplish the purpose of the invention.

The upstanding portion 9 of the heater is substantially large and is provided with a closure 21 so that the device may be readily cleaned should it become clogged with soot, or need repairing.

The chimney is indicated by the numeral 22 and communicates with the upstanding portion 9, it being understood that the chimney passes through the upper portion of the brooder to carry off the smoke and objectionable fumes from the heater.

From the foregoing it will be seen that due to this construction, the floor of the brooder will be thoroughly heated to keep the chicks' feet warm, and the heat from the upstanding portion, as well as the heat arising from the floor, will of course maintain the proper temperature in the brooder so that the chicks will not crowd.

I claim:

1. A brooder including a housing, a tubular heater under the housing and under the floor of the housing, inclined end portions forming a part of the heater, the inclined end portions having exposed outer extremities, closures for normally closing the outer extremities, grates in the heater on which the fuel is supported, and a chimney communicating with the heater for carrying fumes from the heater.

2. A brooder including a housing, having a floor, an elongated heater embedded in the ground surface under the floor, said heater having inclined ends extending above the ground surface at the sides of the housing, hinged closures for closing the inclined ends, pivoted grate members within the heater and on which fuel is supported, and a smokestack extending through the housing and communicating with the heater.

3. A brooder including a housing, a heater extending transversely under the housing and embedded in the ground surface on which the housing rests, said heater having inclined upper ends extending above the ground surface, grates within the heater, and a chimney extending through the housing and communicating with the heater.

4. A brooder including a housing, a heater including a rectangular body portion extending under the brooder and having upwardly disposed end portions, pivoted grate bars within the heater, operating bars connected with the grate bars and extending through the inclined end portions, said grate bars adapted to be moved by the operating bars to raise and lower the grate bars, and a chimney communicating with the central portion of the heater and extending through the housing to carry off smoke and products of combustion.

5. A brooder including a housing, a tubular heater embedded in the ground surface under the housing and having upwardly disposed end portions through which material may be fed to the heater, grates in the tubular heater on which fuel is adapted to be supported, and a chimney including an enlarged upstanding portion and extending through the housing and communicating with the heater.

In testimony that I claim the foregoing as my own, I have hereto affixed my signature.

AGNES SJOSTROM.